Dec. 20, 1966     A. HARAUTUNEIAN     3,292,627

CATHETER

Filed March 25, 1963

INVENTOR.
ANDREW HARAUTUNEIAN
BY
White & Haefliger
ATTORNEYS.

3,292,627
CATHETER
Andrew Harautuneian, Gardena, Calif., assignor to Pharmaseal Laboratories, Glendale, Calif., a corporation of California
Filed Mar. 25, 1963, Ser. No. 267,724
4 Claims. (Cl. 128—349)

This invention has to do with improved balloon-type catheters, i.e., catheters wherein a flexible lumen tube carries an inflatable surface part that may be enlarged after insertion of the catheter in use.

Heretofore it has been proposed to form such catheters by various techniques including the application to a dual lumen passage tube of a preformed "balloon" material which is inflatable by pressure communicated through a smaller lumen passage. Also proposed has been to apply to a rubber lumen tube a coating or layer which is free from adherence to the tube to an extent permitting of balloon-like inflation.

The present invention has for its general object to provide balloon-type catheters which are superior to the conventional in many respects including dependability for retainable proper inflation in use, capacity for sterilization and avoidance of patient infection as well as irritation by reason of the composition of the catheter parts, relative comfort to the patient due to reduced tube size and soft flexibility of the balloon component, and the achievement of all these advantages in a catheter that can be made so inexpensively that it may be economically discarded after a single use.

The invention contemplates the manufacture of catheters entirely from plastic materials devoid of possible irritants such as rubber compounding or curing agents, all in a manner such that the ballon constitutes, in effect, a terminally integrated surface continuity of the tube creating no bondage or sterilization problems, and having all necessary properties for sustained inflation. By plastic formation of the assembly as later explained it is possible to minimize the tube diameter and balloon bulk, all to greater comfort of the patient. As herein used, the term "plastic" is exclusive of rubbers, natural or synthetic.

The tubular catheter body is preferably made of an extruded section of soft, flexible, medical-grade of plasticized polyvinyl chloride, the hardness of which preferably measures between 55 and 75 on the Shore A hardness scale. Other suitable materials include copolymers of polyvinyl chloride and polyvinyl acetate, copolymers of polyethylene with polyisobutylene, copolymers of polyethylene with acrylic esters (e.g. ethyl acrylate) such as Union Carbide Bakelite No. 6169 or Dow Chemical Zetafin, and the elastomeric grades of polyurethane such as Goodrich Chemical Company "Estane" or Mobay Chemical Company "Texin." Catheter tubes made of such plastic materials have a distinct advantage, among others, over rubber catheter tubes in that they may be extruded to form larger channels for a given outside diameter, or conversely, permit of desirably reduced diameters for given or adequate internal lumen passage sizes.

The invention aims to provide on the plastic lumen tube an elastic, non-rubber surface layer, easily applicable as by a dipping technique, which has adequate stretchability for safe inflation, and sufficient elastic restorability after inflation as to be removable without undue irritation. It has been found that such properties may be given the balloon layer by making it of plasticized polyvinyl chloride or copolymers of polyvinyl chloride with polyvinyl acetate, polyethylene or copolymers of polyethylene with polyisobutylene, or more preferably of an elastomeric grade of polyurethane, the particular material being selectable in terms of its stretch modulus and restorability as well as its high resistance to oxidative degradation.

In more particular reference to the surface or balloon layer, properties desired have been found for example in poly (ester-urethane) of elastic grade and having a 300% stretch modulus desirably within about the 600 to 1200 p.s.i. range. As an example, I have satisfactorily used Goodrich Chemical "Estane #5740x1" polymer, a poly (ester-urethane) elastomer, the properties of which have been published in B. F. Goodrich Chemical Company Bulletin G–18, as revised July 1960, and also in the 1963 Modern Plastics Encyclopedia, pages 188–189. A similar elastomer is Mobay Chemical Company's "Texin."

Generally considered, the invention contemplates applying to a length of the catheter tube a surface layer adherent to the tube but inflatable within an intermediate extent of that length, which tube also contains a small lumen passage opening for the introduction of pressurizing fluid. Assuring inflatability of such intermediate extent of the surface layer requires assurance against its adherence to the tube surface. In this respect, the invention has for its object to provide a novel and effective means for freeing the surface layer for balloon-like enlargement complete about the tube.

In keeping with this objective, the invention contemplates preliminarily applying to the tube at the location of an opening leading from the smaller lumen passage, a partitioning coating upon which the balloon layer is deposited, and which thereafter is removable from the tube-balloon interface. The invention provides for the use of a partitioning coating material capable of dissolution in a solvent introduced through the small lumen opening, and preferably employs a water soluble coating or film that will dissolve in water so introduced to free the balloon extent of the surface layer for expansion or inflation. Useable partitioning materials include cold water soluble grades of polyvinyl alcohol, or prepared film thereof (see Modern Plastics Encyclopedia, pages 303–304), methyl cellulose, starch derivatives, dextran or polyvinylpyrrolidone. Of these cold water-soluble poly-vinyl alcohol is preferred.

Ordinarily the device will be supplied with the partitioning coating intact. At the time of use aqueous liquid in which the partitioning film is soluble, and which need be only water at ordinary temperature, may be introduced through the small lumen passage of the tube under sufficient pressure to dissolve the coating from the tube-surface layer interface and to expand the surface layer to appropriate inflation.

The particular manner in which the tube, partitioning coating and surface layer are formed and associated will be now fully understood from the following detailed description of an illustrative embodiment of the invention shown by the accompanying drawing, in which.

Figure 1:
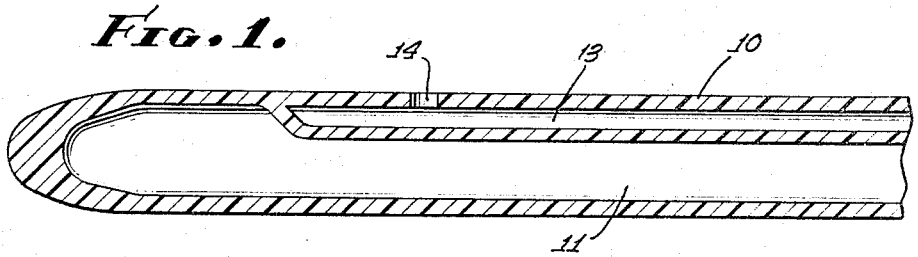
FIG. 1 is a view showing the tip extent of the dual passage lumen tube.

The lumen tube 10 is shown to contain for the usual purposes, a relatively large passage 11 and a smaller passage 13 through which fluid may be introduced to opening 14 in the tube wall. It will be understood that any suitable or conventional means may be employed to provide access to the passages 11 and 13. As previously indicated, the tube 10 is made of a suitable plastic, preferably, though typically, of polyvinyl chloride, plasticized to render the tube softly flexible.

Figure 2:
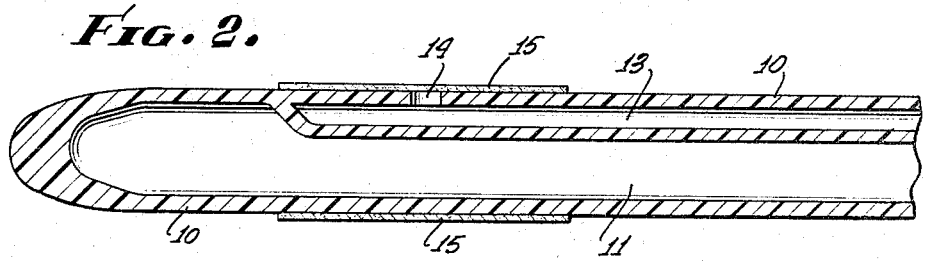
FIG. 2 is a similar view illustrating application of the partitioning coating.

Referring to FIG. 2, the initial step toward formation of the balloon is the application of a coating 15 which typically may be in the order of about 0.5–1 mil. thick, to that extent of the tube which is to accommodate the balloon and predetermine its dimension axially of the tube, the coated length containing the opening 14. A coating material such as a water soluble grade of polyvinyl alcohol film, has adequate adherence to the surface of the tube 10, while being capable of ready displacement by and dissolution in aqueous solvent, which usually will be water at room temperature, delivered through passage 13 and opening 14. Application of the coating in film form also has the advantages of predetermining the coating thickness and assuring its continuity about that length of the tube that will leave uncovered the opening 12 and the tip extent of the tube beyond. In this respect, the ends of the film may be overlapped somewhat so that upon dissolution of the film, the surface or balloon layer will be completely freed for expansion about the tube. The overlapping ends of the film may be smoothed and thinned using a hot tool, thus to remove the discontinuity normally formed by the overlap and to form a seal which cannot be penetrated by the surface layer 16 during the dipping process.

Figure 3:
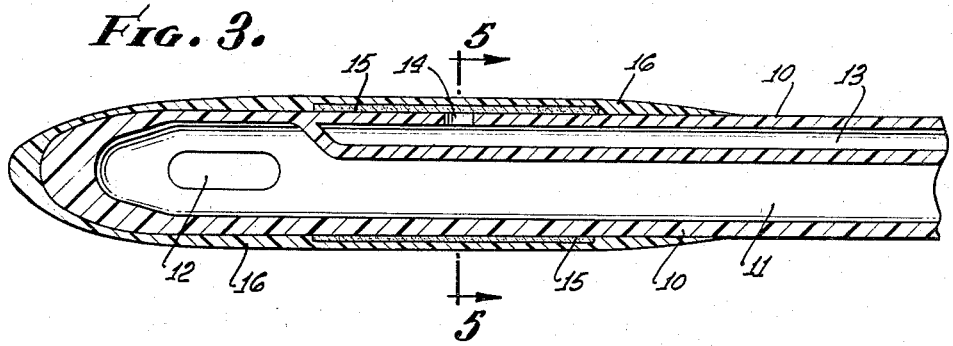
FIG. 3 illustrates completion of the further steps of applying the inflatable surface layer and forming the inlet opening.

After application of the coating 15, a surface layer 16 of the elastic plastic, preferably poly (ester-urethane), is applied as shown in FIG. 3 about the partitioning medium and also to sufficient extents of the tube surface beyond the coating 15, and including the tip, to provide for secure bondage to the tube. It is found that the layer 16 may be satisfactorily applied to a thickness about the coating of between about 0.003 and 0.008 in. by dipping the tube in the poly (ester-urethane) dissolved in a suitable solvent such as tetrahydrofuran, dimethyl formamide or a 80–20 solution of tetrahydrofuran and cyclohexanone. Following the dipping an opening 12 is formed through the coated tube wall to provide for fluid flow into or out of passage depending upon whether the catheter is to be used for irrigation or drainage.

Figure 4:
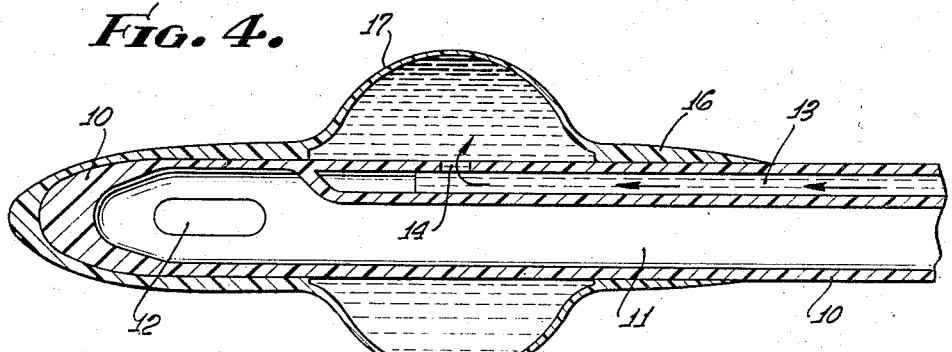
FIG. 4 shows expanded balloon formation.
Figure 5:
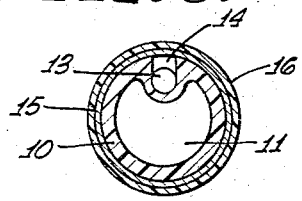
FIG. 5 is a cross section on line 5—5 of FIG. 3.

The catheter is manufactured and supplied for use in the FIG. 3 condition. At the time of use, water is fed through passage 13 for access through opening 14 to the partitioning coating 15, resulting in dissolution of the latter and expansion of the corresponding length of the surface layer 16 to form the balloon 17 as shown in FIG. 4, the degree of balloon inflation of course being governable in accordance with the water volume.

As previously indicated, utilizing for the surface layer 16 a plastic material having a 300% modulus of from about 600 to 1200 p.s.i., and preferably at about 1000 p.s.i., the balloon may readily and safely be inflated to at least 250% elongation of the surface layer, with recovery to an extent assuring the patient against undue irritation during removal of the catheter. Its acceptability is further favored by the very pliant softness of the balloon.

Under a possible abnormal situation, as when the small lumen passage may become plugged against release of the balloon inflating liquid, it may be necessary to rupture the balloon in order to effect its withdrawal. As contrasted with rubber balloons which may have undesirably excessive elongation, and therefore inflation, to the break point, the invention provides a kind and quality of elastomer whose break point is in the range of about 300 to 600 percent elongation. As a specific example, the Goodrich Chemical "Estane #5740x1" poly (ester-urethane) polymer has a break point at about 540 percent elongation. Thus, in the event of necessity for rupture of the balloon, its breakage can be accomplished without objectionably excessive inflation.

I claim:

1. A medical catheter for insertion into a body passage, said catheter comprising:
    (A) an elongated flexible thermoplastic tube having an open end, a partially closed opposite end and a first longitudinal passage;
    (B) said tube having an opening adjacent the partially closed end to allow drainage of body fluids through said passage to said open end;
    (C) said tube defining a second inflation passage smaller than and independent of said first passage and extending longitudinally of said tube, said second smaller passage having an open end adjacent the open end of the tube and a closed end adjacent the partially closed end of said tube;
    (D) an elastic thermoplastic layer encircling a longitudinal section of said tube adjacent its partially closed end, said layer being bonded at two longitudinally spaced areas to said tube but being free of attachment to the tube between said spaced areas to provide an inflatable balloon section;
    (E) said catheter having a small restricted opening connecting said second passage with a space between the tube and the inflatable balloon section; and
    (F) a partitioning coating encircling the entire portion of the exterior surface of the tube within the balloon section, said partitioning coating being constructed of a material readily and completely soluble in water at room temperature, whereby said partitioning material prevents the balloon section from adhering to the underlying exterior surface of the tube prior to inflation of said balloon, and whereby the partitioning coating when dissolved in water at room temperature provides a solution which can be easily removed through the small restricted opening and the inflation passage to deflate the catheter balloon.

2. A medical catheter as set forth in claim 1 wherein the partitioning coating is selected from the group consisting of a water soluble grade of polyvinyl alcohol and methylcellulose.

3. A medical catheter as set forth in claim 1 wherein the balloon layer has a break point between 300 and 600 percent elongation, and has a 300 percent modulus of from 600 to 1200 p.s.i.

4. A medical catheter comprising:
    (A) a flexible thermoplastic tube with a wall defining a main drainage lumen extending from a distal end to a proximate end, which proximate end is adapted for insertion into a patient and with a port adjacent the proximate end through which fluid can enter the main drainage lumen, said flexible thermoplastic tube having associated therewith an inflation lumen extending longitudinally along said tube wall with the inflation lumen communicating with an exterior surface of the tube wall through an inflation opening;
    (B) a partitioning coating surrounding an exterior surface area of the tube wall about said inflation opening; and
    (C) an elastic thermoplastic balloon layer bonded to the tube beyond ends of said coating and encasing said coating between said balloon layer and said tube, said partitioning coating having the property of being completely and totally dissolved in aqueous inflating liquid introduced through said inflation lumen and inflation opening to expand said balloon layer, whereby completely dissolved coating material can exit through said inflation opening and along the inflation lumen upon deflation of said balloon layer.

References Cited by the Examiner

UNITED STATES PATENTS

| | | | |
|---|---|---|---|
| 1,595,006 | 8/1926 | Kelly et al. | 156—155 |
| 2,230,151 | 1/1941 | Winder | 18—58.5 |
| 2,390,070 | 12/1945 | Auzin | 18—58.6 |
| 2,799,273 | 7/1957 | Oddo | 128—349 |
| 2,912,981 | 11/1959 | Keough | 128—349 |
| 3,044,468 | 7/1962 | Birtwell | 128—349 |

RICHARD A. GAUDET, Primary Examiner.

DALTON L. TRULUCK, Examiner.